United States Patent
Xu et al.

(10) Patent No.: US 12,328,067 B2
(45) Date of Patent: Jun. 10, 2025

(54) REGULATOR WITH FLIPPED VOLTAGE FOLLOWER ARCHITECTURE

(71) Applicant: Faraday Technology Corp., Hsin-Chu (TW)

(72) Inventors: Chen-Hui Xu, Suzhou (CN);
Xiao-Dong Fei, Suzhou (CN);
Wen-Chi Huang, Hsin-Chu (TW);
Hui-Wen Hu, Suzhou (CN)

(73) Assignee: Faraday Technology Corp., Hsin-Chu (TW)

( * ) Notice: Subject to any disclaimer, the term of this patent is extended or adjusted under 35 U.S.C. 154(b) by 255 days.

(21) Appl. No.: 18/135,182

(22) Filed: Apr. 16, 2023

(65) Prior Publication Data
US 2024/0178753 A1    May 30, 2024

(30) Foreign Application Priority Data

Nov. 24, 2022   (CN) .......................... 202211483125.5

(51) Int. Cl.
*G05F 1/56*        (2006.01)
*G05F 1/575*       (2006.01)
*H02M 3/155*       (2006.01)

(52) U.S. Cl.
CPC .................... *H02M 3/155* (2013.01)

(58) Field of Classification Search
CPC .................... G05F 1/56; G05F 1/575
See application file for complete search history.

(56) References Cited

U.S. PATENT DOCUMENTS

| 11,146,262 | B1 * | 10/2021 | Wang ................ H03K 17/162 |
| 2018/0307257 | A1 | 10/2018 | Luria |
| 2024/0143007 | A1 * | 5/2024 | Kathuria ................ G05F 1/59 |

FOREIGN PATENT DOCUMENTS

TW          202223580 A        6/2022

* cited by examiner

*Primary Examiner* — Sisay G Tiku
(74) *Attorney, Agent, or Firm* — Winston Hsu

(57) ABSTRACT

The present invention discloses a regulator. The regulator includes a bias voltage generating circuit and a flipped voltage follower (FVF), wherein the bias voltage generating circuit is configured to generate a bias voltage, and the FVF is configured to generate an output voltage according to the bias voltage and a supply voltage. The FVF includes a first P-type transistor and a first N-type transistor. The P-type transistor is configured to receive the bias voltage via a gate electrode of the P-type transistor, to generate the output voltage on a source electrode of the P-type transistor. A drain electrode of the first N-type transistor is connected to the supply voltage, a source electrode of the first N-type transistor is connected to the source electrode of the first P-type transistor, and a gate electrode of the first N-type transistor receives a driving signal for compensating the output voltage.

9 Claims, 1 Drawing Sheet

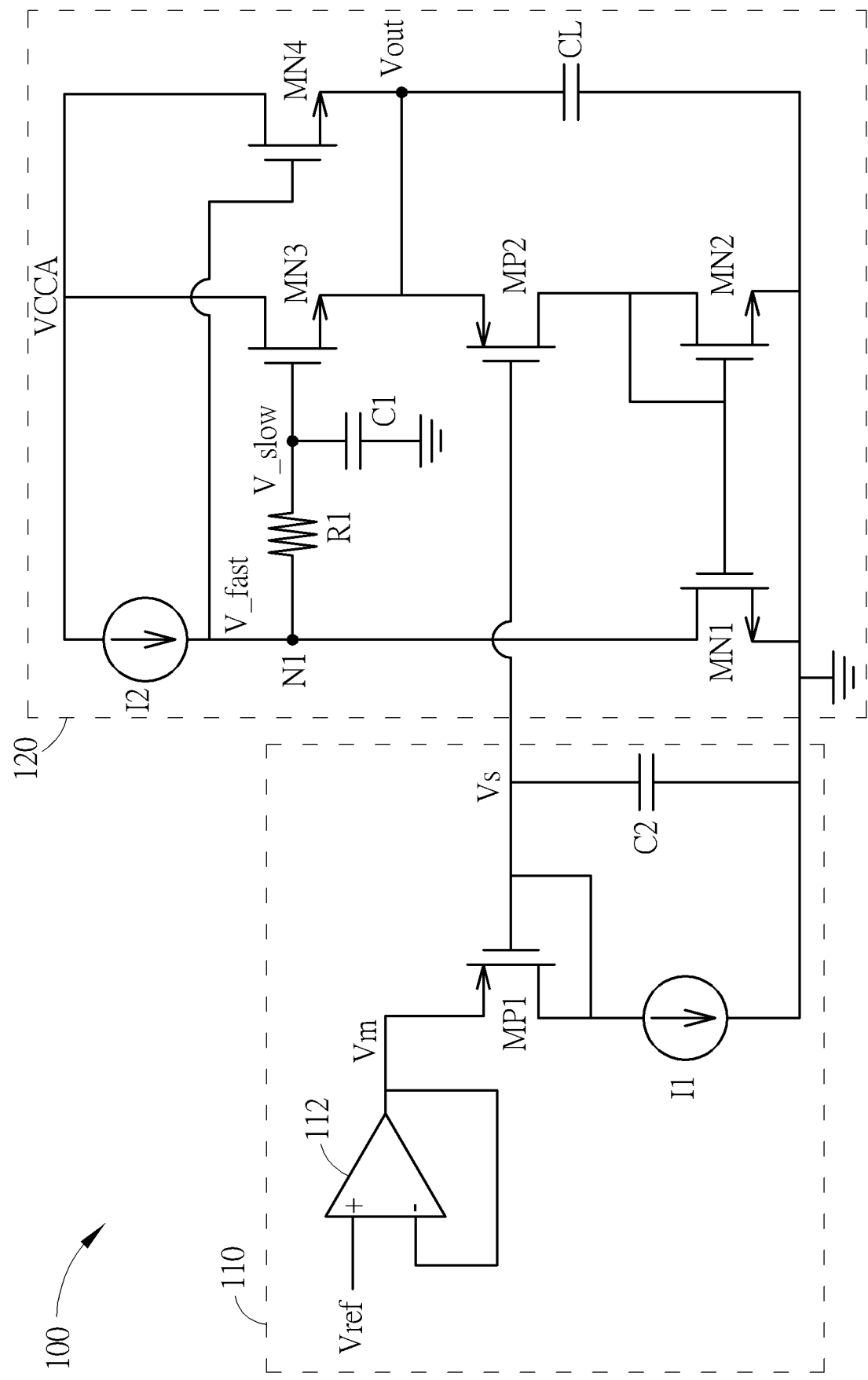

REGULATOR WITH FLIPPED VOLTAGE FOLLOWER ARCHITECTURE

BACKGROUND OF THE INVENTION

1. Field of the Invention

The present invention is related to regulators based on flipped voltage follower (FVF) architecture.

2. Description of the Prior Art

As flipped voltage followers (FVFs) have high sourcing ability and small output impedance, FVFs are widely adopted in regulator designs. Related art regulators based on FVF architecture typically have problems related to load response, load regulation and power supply rejection (RSR), however. Thus, how to design a regulator with improved performance becomes an important issue.

SUMMARY OF THE INVENTION

Thus, an objective of the present invention is to provide a regulator based on a flipped voltage follower (FVF) architecture with improved performance, in order to solve the problems of the related art.

In an embodiment of the present invention, a regulator is disclosed. The regulator comprises a bias voltage generating circuit and a flipped voltage follower (FVF), wherein the bias voltage generating circuit is configured to generate a bias voltage, and the FVF is configured to generate an output voltage according to the bias voltage and a supply voltage. In addition, the FVF comprises a first P-type transistor and a first N-type transistor. The first P-type transistor is configured to receive the bias voltage via a gate electrode of the first P-type transistor, to generate the output voltage on a source electrode of the first P-type transistor. The first N-type transistor comprises a drain electrode connected to the supply voltage, a source electrode connected to the source electrode of the first P-type transistor, and a gate electrode which receives a first driving signal for compensating the output voltage.

In an embodiment of the present invention, a regulator is disclosed. The regulator comprises a bias voltage generating circuit and a FVF, wherein the bias voltage generating circuit is configured to generate a bias voltage, and the FVF is configured to generate an output voltage according to the bias voltage and a supply voltage. In addition, the FVF comprises a first P-type transistor, a first transistor and a second transistor. The first P-type transistor is configured to receive the bias voltage via a gate electrode of the first P-type transistor to generate the output voltage. The first transistor is connected between the supply voltage and a source electrode of the first P-type transistor, and the first transistor receives a first driving signal to compensate the output voltage. The second transistor is connected between the supply voltage and the source electrode of the first P-type transistor, and the second transistor receives a second driving signal to compensate the output voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIG. 1s a diagram illustrating a regulator according to an embodiment of the present invention.

DETAILED DESCRIPTION

The FIG. 1s a diagram illustrating a regulator 100 according to an embodiment of the present invention, where the regulator 100 is configured to receive a supply voltage VCCA and then generate an output voltage Vout. As shown in the FIGURE, the regulator 100 comprises a bias voltage generating circuit 110 and a flipped voltage follower (FVF) 120, where the bias voltage generating circuit 110 comprises an operational amplifier 112, a P-type transistor MP1, a capacitor C2 and a current source I1. The FVF 120 comprises four N-type transistors MN1, MN2, MN3 and MN4, a P-type transistor MP2, a resistor R1, a capacitor C1, a load capacitor CL and a current source I2.

In the bias voltage generating circuit 110, a positive input node of the operational amplifier 112 is configured to receive a reference voltage Vref, and a negative input node of the operational amplifier 112 is connected to an output node of the operational amplifier 112. A source electrode of the P-type transistor MP1 is connected to the output node of the operational amplifier 112, and a drain electrode of the P-type transistor MP1 is connected to the current source I1. The capacitor C2 is connected between the gate electrode of the P-type transistor MP1 and a ground voltage. In operations of the bias voltage generating circuit 110, the operational amplifier 112 receives the reference voltage Vref to generate a voltage Vm on the output node of the operational amplifier 112, and the P-type transistor MP1 generates a bias voltage Vs according to the voltage Vm and a fixed current provided by the current source I1.

It should be noted that this detailed circuit architecture of the bias voltage generating circuit 110 is for illustrative purposes only, and is not meant to be a limitation of the present invention. In other embodiments, as long as the fixed bias voltage Vs can be generated, the bias voltage generating circuit 110 may be implemented with different circuit designs.

In the FVF 120, a gate electrode of the P-type transistor MP2 receives the bias voltage Vs generated by the bias voltage generating circuit 110. A drain electrode of the N-type transistor MN1 is connected to the current source I2, and a source electrode of the N-type transistor MN1 is connected to the ground voltage. A drain electrode of the N-type transistor MN2 is connected to a drain electrode of the P-type transistor MP2, a source electrode of the N-type transistor MN2 is connected to the ground voltage, and a gate electrode of the N-type transistor MN2 is connected to a gate electrode of the N-type transistor MN1. A drain electrode of the N-type transistor MN3 is connected to the supply voltage VCCA, a source electrode of the N-type transistor MN3 is connected to a source electrode of the P-type transistor MP2, and a gate electrode of the N-type transistor MN3 is connected to a node N1 via the resistor R1 and the capacitor C1. A drain electrode of the N-type transistor MN4 is connected to the supply voltage VCCA, a source electrode of the N-type transistor MN4 is connected to a source electrode of the P-type transistor MP2, and a gate electrode of the N-type transistor MN4 is connected to the node N1. The load capacitor CL is connected between source electrodes of the N-type transistors MN3/MN4 and the ground voltage. In operations of the FVF 120, the P-type transistor MP2 receives the bias voltage Vs to make the FVF 120 generate the output voltage Vout. Under an ideal condition, the output voltage Vout may be close to the voltage Vm. In addition, the P-type transistor MP2 serves as a common gate amplifier. If the output voltage Vout has a small change due to a sudden increase in backend load(s), this change will be amplified to the drain electrode of the P-type transistor MP2; the N-type transistor MN3 and MN4 can then be controlled by driving signals generated by the N-type transistors MN1 and MN2 in order to compensate the output voltage Vout.

In the embodiment of the FIGURE, the N-type transistors MN3 and MN4 serve as power metal-oxide semiconductors (MOSs). By utilizing the N-type transistors MN3 and MN4 as the power MOSs, a fast load response can be obtained in order to quickly compensate the output voltage Vout. In addition, the FVF 120 utilizes two N-type transistors such as MN3 and MN4 as the power MOSs, and the two N-type transistors MN3 and MN4 can be respectively driven by two driving signals of different speeds. For example, when a voltage on the node N1 changes, a driving voltage V_fast generated thereon may control the N-type transistor MN4 to immediately compensate the output voltage Vout. After the driving voltage V_fast is delayed by the resistor R1 and the capacitor C1, a driving signal V_slow, which is slower than the driving voltage V_fast, may be generated for controlling the N-type transistor MN3. In particular, the FVF 120 has two poles (e.g. low frequency poles) and one zero, where a first pole is $(1/(rmn1*C1))$, a second pole is $(1/(rout*CL))$, and the zero is $(1/(R1*C1)*(1+gmn3/gmn4))$, where rmn1 is an output impedance of the N-type transistor MN1, rout is an output impedance of the FVF 120, gmn3 is a transconductance of the N-type transistor MN3, and gmn4 is a transconductance of the N-type transistor MN4. In this embodiment, a position of the zero can be controlled by adjusting a dimension ratio of the N-type transistors MN3 and MN4, and the zero which can be flexibly adjusted can be configured to compensate the second pole positioned on an output node of the FVF 120. Furthermore, as the first pole is positioned on the gate electrodes of the N-type transistors MN3 and MN4, an output impedance on the gate electrodes of the N-type transistors MN3 and MN4 can be increased, where a gain can be increased and load regulation can be reduced without impacting stability of an overall loop.

In addition, by installing the capacitor C1 on the gate electrode of the N-type transistor MN3, the driving signal V_slow is less likely to be interfered with by power, thereby increasing a power supply rejection ratio.

In this embodiment, the N-type transistor MN2 adopts a diode-connected MOS, which means the gate electrode of the N-type transistor MN2 is connected to the drain electrode of the N-type transistor MN2, instead of utilizing the N-type transistor MN2 as a current source with a fixed current. Thus, with the cooperation of the current source I1 and the N-type transistor MN1, the N-type transistor MN2 can have better sinking ability, allowing the compensation to be quickly performed in response to occurrence of an overshoot effect of the output voltage Vout.

In another embodiment of the present invention, the resistor R1 and the capacitor C1 may be replaced with any delay circuit which is capable of delaying signals, as long as the delay circuit can delay the driving signal V_fast for generating the driving signal V_slow.

In another embodiment of the present invention, the FVF 120 may have one power MOS only. In this case, the N-type transistors MN4 shown in the FIGURE may be removed from the FVF 120.

In another embodiment of the present invention, the N-type transistor MN2 may be implemented with any suitable current source other than the diode-connected MOS.

In another embodiment of the present invention, the power MOSs within the FVF 120 does not have to be N-type transistors. In this case, the N-type transistors MN3 and MN4 shown in the FIGURE may be replaced with P-type transistors.

The regulator illustrated in the FIGURE can achieve a fast load response, an increased gain of the circuit, and reduced load regulation without impacting stability of an overall loop, thereby solving the problems present in the related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A regulator, comprising:
 a bias voltage generating circuit, configured to generate a bias voltage; and
 a flipped voltage follower (FVF), configured to generate an output voltage according to the bias voltage and a supply voltage, wherein the FVF comprises:
  a first P-type transistor, configured to receive the bias voltage via a gate electrode of the first P-type transistor, to generate the output voltage on a source electrode of the first P-type transistor;
  a first N-type transistor, comprising a drain electrode connected to the supply voltage, a source electrode connected to the source electrode of the first P-type transistor, and a gate electrode which receives a first driving signal for compensating the output voltage; and
  a second N-type transistor, comprising a drain electrode connected to the supply voltage, a source electrode connected to the source electrode of the first P-type transistor, and a gate electrode which receives a second driving signal for compensating the output voltage.

2. The regulator of claim 1, wherein the FVF further comprises:
 a delay circuit, configured to perform a delay operation on the second driving signal to generate the first driving signal.

3. The regulator of claim 2, wherein the delay circuit comprises:
 a resistor; and
 a capacitor, comprising one node connected to the resistor and the gate electrode of the first N-type transistor, and another node connected to a ground voltage.

4. The regulator of claim 1, wherein the bias voltage generating circuit comprises:
 a second P-type transistor, comprising a source electrode for receiving a voltage, a drain electrode coupled to a ground voltage, and a gate electrode configured to generate the bias voltage to the FVF.

5. A regulator, comprising:
 a bias voltage generating circuit, configured to generate a bias voltage; and
 a flipped voltage follower (FVF), configured to generate an output voltage according to the bias voltage and a supply voltage, wherein the FVF comprises:
  a first P-type transistor, configured to receive the bias voltage via a gate electrode of the first P-type transistor, to generate the output voltage on a source electrode of the first P-type transistor;
a first N-type transistor, comprising a drain electrode connected to the supply voltage, a source electrode connected to the source electrode of the first P-type transistor, and a gate electrode which receives a first driving signal for compensating the output voltage;
a third N-type transistor, comprising a drain electrode connected to a drain electrode of the first P-type transistor, and a gate electrode connected to the drain electrode;
a fourth N-type transistor, comprising a gate electrode connected to the gate electrode of the third N-type transistor, wherein the fourth N-type transistor generates the first driving signal on the drain electrode of the fourth N-type transistor; and
a current source, connected to the drain electrode of the fourth N-type transistor.

6. A regulator, comprising:
a bias voltage generating circuit, configured to generate a bias voltage; and
a flipped voltage follower (FVF), configured to generate an output voltage according to the bias voltage and a supply voltage, wherein the FVF comprises:
  a first P-type transistor, configured to receive the bias voltage via a gate electrode of the first P-type transistor to generate the output voltage;
  a first transistor, connected between the supply voltage and a source electrode of the first P-type transistor, for receiving a first driving signal to compensate the output voltage; and
  a second transistor, connected between the supply voltage and the source electrode of the first P-type transistor, for receiving a second driving signal to compensate the output voltage.

7. The regulator of claim 6, wherein the FVF further comprises:
a delay circuit, configured to perform a delay operation on the second driving signal to generate the first driving signal.

8. The regulator of claim 7, wherein the delay circuit comprises:
a resistor; and
a capacitor, comprising one node connected to the resistor and a gate electrode of the first transistor, and another node connected to a ground voltage.

9. The regulator of claim 6, wherein the bias voltage generating circuit comprises:
a second P-type transistor, comprising a source electrode for receiving a voltage, a drain electrode coupled to a ground voltage, and a gate electrode configured to generate the bias voltage to the FVF.

* * * * *